United States Patent [19]
Kitamura et al.

[11] Patent Number: 5,172,464
[45] Date of Patent: Dec. 22, 1992

[54] MACHINE TOOL

[75] Inventors: Koichiro Kitamura; Katsuji Taniguchi; Shigeru Yamada, all of Takaoka, Japan

[73] Assignee: Kitamura Machinery Co., Ltd., Japan

[21] Appl. No.: 709,886

[22] Filed: Jun. 4, 1991

[30] Foreign Application Priority Data

Jun. 25, 1990 [JP] Japan .................. 2-164088

[51] Int. Cl.⁵ .................. B23Q 7/02; B23Q 41/02; B65G 47/00
[52] U.S. Cl. .................. 29/563; 29/33 P; 198/346.1; 409/168; 409/224
[58] Field of Search ............. 29/33 P, 561, 563, 27 R, 29/564, 48.5 R, 568; 198/345.3, 346.1, 346.2, 803.2, 803.1; 409/224, 221, 164, 165, 166, 167, 168; 408/234

[56] References Cited

U.S. PATENT DOCUMENTS

| | | | |
|---|---|---|---|
| 3,822,959 | 7/1974 | Tabard | 408/234 X |
| 3,998,127 | 12/1976 | Romeu | 409/224 X |
| 4,637,108 | 1/1987 | Murata et al. | 29/33 P |
| 4,644,635 | 2/1987 | Murai et al. | 29/48.5 R X |
| 4,664,570 | 5/1987 | Tsukiji et al. | 409/168 |
| 4,679,286 | 7/1987 | Momoi et al. | 198/346.1 X |
| 4,712,282 | 12/1987 | Romeu | 29/27 C |
| 4,797,990 | 1/1989 | Yamaguchi et al. | 29/568 |
| 5,044,486 | 9/1991 | Kitamura | 198/346.1 |

FOREIGN PATENT DOCUMENTS 3834208  4/1989  Fed. Rep. of Germany ... 198/346.1

Primary Examiner—William Briggs
Attorney, Agent, or Firm—Ronald P. Kananen

[57] ABSTRACT

A machine tool comprises: (a) a tool (22); (b) a body (2); (c) a tool supporting means (10) for supporting the tool (22) provided relative to the body (2); (d) a means (4) for supporting a pallet (P) for setting a work (W), the support means (36, 35) being provided relative to the body (2); (e) a first moving means (31, 32, 32a, 33, 34, 37, 39) for moving the means (4) about a center axis (U2) along a first direction (B1, B2); and (f) a second moving means (11, 12, 13, 14, 15, 16, 17, 18, 19, 20) for moving the tool supporting means (10) so as to cause relative motion between the tool supporting means (10) and the means (4) for performing machining operation of the work (W).

19 Claims, 16 Drawing Sheets ated continuously rotated about a first center axis U1 by a motor 40.

MACHINE TOOL

BACKGROUND OF THE INVENTION

This invention relates to a machine tool.

A typical example of a prior art machining operation of a work having six sides set on a table in a machine tool will be explained hereinafter. In order to drill the first and second sides, of the work, the first side is drilled by the drill and then the work is removed from the table. After that, the work is set again on the table in such a manner that the second side of the work is drilled by the drill. The drilling operation of the first and second sides can be performed in the above-mentioned manner.

However, it is troublesome to perform the above mentioned setting operations of the work. Also, after drilling the first side, an operator prefers to roughly remove chips adhered on the first side during the drilling operation.

SUMMARY OF THE INVENTION

An object of this invention is to provide a machine tool in which at least two different sides or faces of a work can be machined without a resetting operation of the work, and in which chips produced during machining operation can be removed from the work. According to this invention, a machine tool comprises: (a) a tool; (b) a body; (c) a tool supporting means for supporting the tool provided relative to the body; (d) a means for supporting a pallet for setting a work, the support means being provided relative to the body; (e) a first moving means for moving the means about a center axis along a first direction; and (f) a second moving means for moving the tool supporting means so as to cause relative motion between the tool supporting means and the means for performing machining operation of the work.

BRIEF DESCRIPTION OF THE PREFERRED EMBODIMENT

Figure 1:
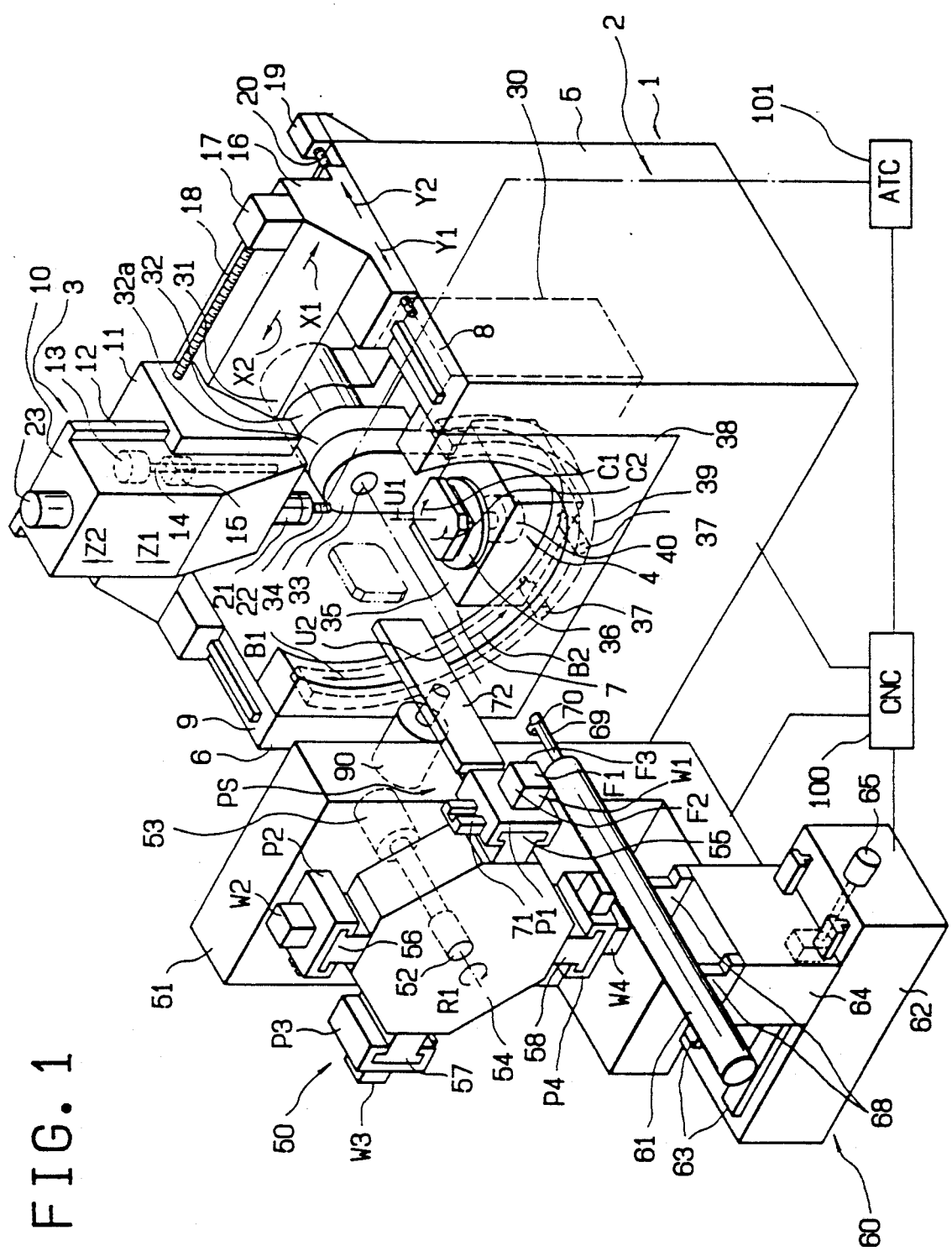
FIG. 1 shows a machining center as a first embodiment of a machine tool according to this invention in which a first center axis U1 of a rotary table is parallel to a vertical line.
Figure 2:
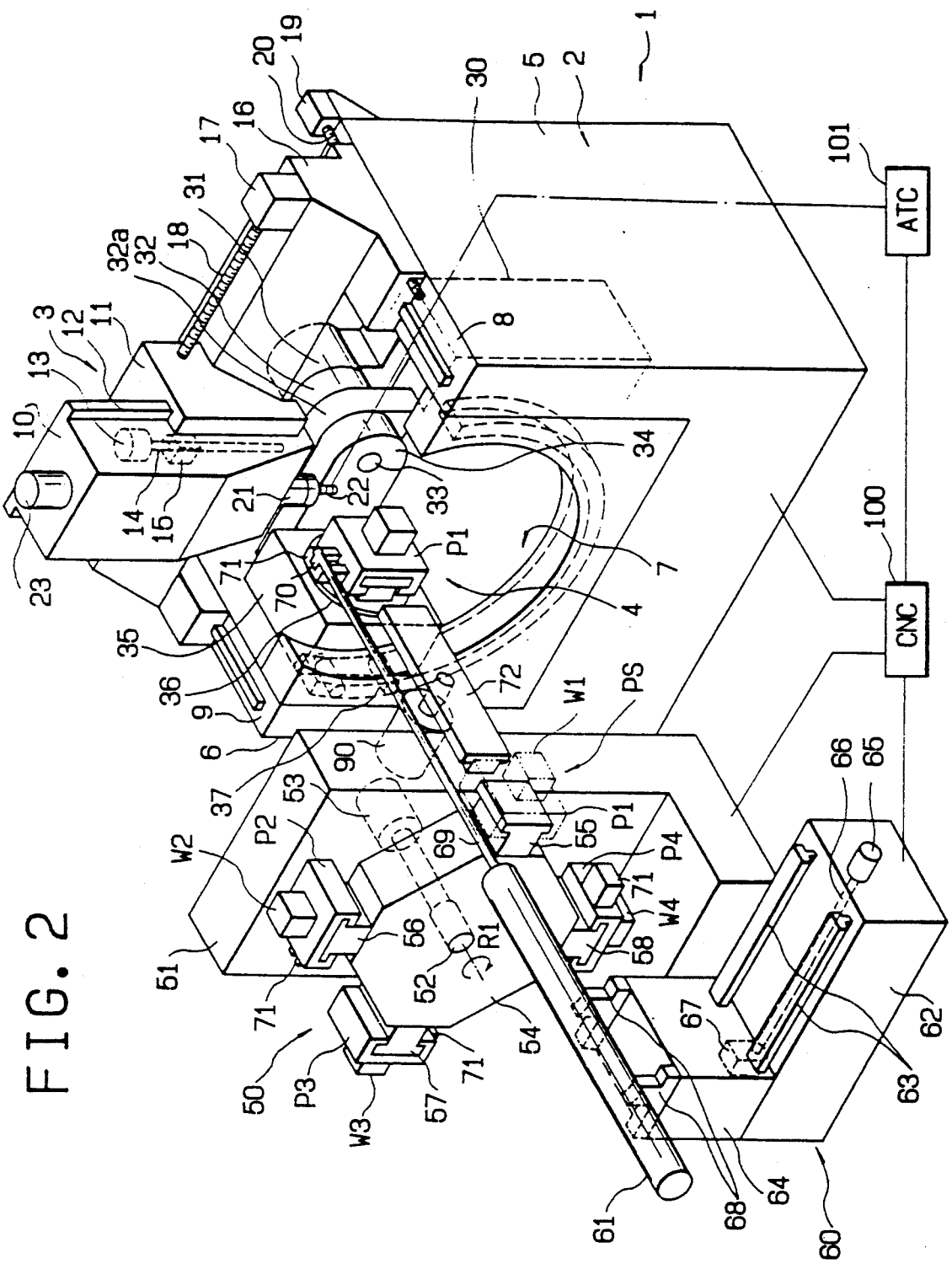
FIG. 2 shows the machining center in which the first center axis U1 of the rotary table is parallel to a horizontal line.

Referring to FIGS. 1 and 2, in a machine tool having a tool or drill 22 for drilling a work W, a table 36 for setting a work W thereon can be preferably indexed and continuously rotated about a first center axis U1 by a motor 40.

The table 36 is rotated about a second center axis U2 perpendicular to the first center axis U1 by an arm 34 and a base 35 so as to position the table 36 at a desired position. The arm 34 and the base 35 are combined as a swing or rotary means.

The arm 34 can rotate, for example, at 90° angle by a motor 31 along a B1-direction as shown in FIGS. 1 and 2.

The drill 22 which is attached in a spindle 10 can be moved relative to the work W on the table 36 along a first direction (X1, X2) by a support 11, a motor 17 and a feedscrew 18. The drill 22 can be moved along a second direction (Y1, Y2) perpendicular to the first direction (X1, X2) by a rail, a motor 19 and a feedscrew 20.

The drill 22 can be moved relative to the work W on the table 36 along a third direction (Z1, Z2) perpendicular to both the first and second directions by a motor 13, a feedscrew 14 and a nut 15.

As mentioned above, the drill 22 attached in the spindle can be moved along the XYZ-axis system, while the works W (W1-W4) on the rotary table 36 are indexed or continuously rotated about the center axis U1 along a C1-direction or a C2-direction. The rotary table 36 holding the work W can be swung or rotated about a second center axis U2 along a B1-direction or a B2-direction.

Figure 3:
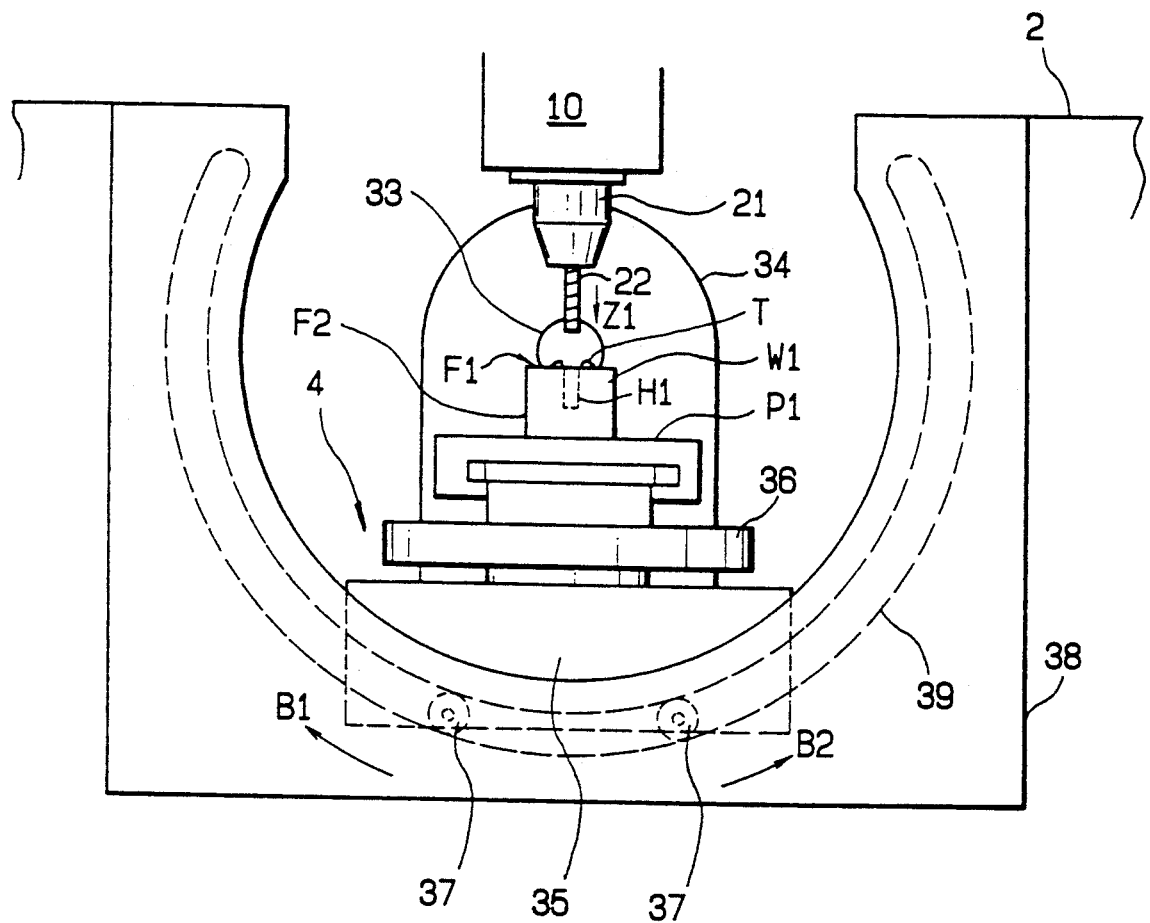
FIG. 3 shows the rotary table whose first center axis U1 is parallel to the vertical line, corresponding to FIG. 1.
Figure 4:
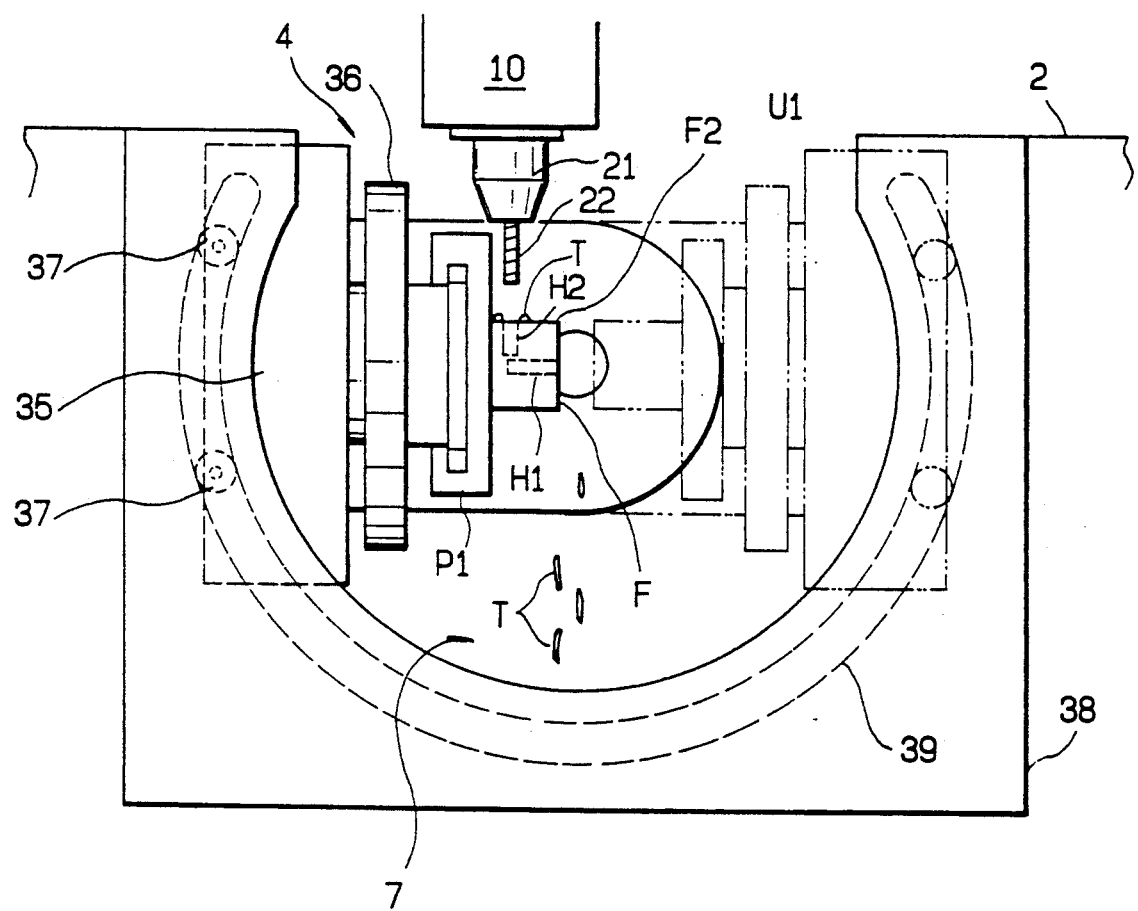
FIG. 4 shows the rotary table whose first center axis U1 is parallel to the horizontal line, corresponding to FIG. 2.

For example, if the rotary table 36 is positioned as shown in FIG. 3, the first side F1 of the work W can be drilled to form a hole H1 (FIG. 4) therein. After that, as shown in FIGS. 2 and 4, chips T produced during drilling operation can be roughly removed from the work W when the rotary table 36 is rotated along the B1-direction at 90° angle. Next, as shown in FIG. 4, the second side F2 of the work W is drilled by the drill 22 to form a hole H2 therein.

DETAILED DESCRIPTION OF THE PREFERRED EMBODIMENTS

FIGS. 1 and 2 show a first embodiment according to this invention.

A machine 1 in FIGS. 1 and 2 is a vertical machining center having a five-axis control system. A XYZ-axis mechanism 3 is arranged on a body 2 of the machine 1 having a work operating means 4 therein.

The body 2 has sidewalls 5, 6, a means 7 for processing chips, and guide faces 8, 9.

A spindlehead 10 of the XYZ-axis mechanism 3 is supported by rails 12 relative to a support 11 and can be vertically moved. A servomotor 13 is fixed to the support 11. A feedscrew 14 of the servomotor 13 engages a nut 15 which is fixed to a spindlehead 10. Thus, by actuating the servomotor 13, the spindlehead 10 can be moved along a Z1-direction or a Z2-direction with respect to the support 11.

A lateral rail 16 is slidably supported on the guide faces 8, 9 of the body 2. A servomotor 17 is fixed on the lateral rail 16. A feedscrew 18 of the servomotor 17 engages a threaded portion of the support 11. By actuating the servomotor 17, the support 11 together with the spindlehead 10 can be moved in a X1-direction or a X2-direction along the lateral rail 16.

A servomotor 19 is fixed on the guide face 8 of the body 2. A feedscrew 20 of the servomotor 19 engages a threaded portion of the lateral rail 16. Thus, by actuating the servomotor 19, the lateral rail 16 can be moved along a Y1-direction or a Y2-direction.

A tool such as a drill 22 is attached in a spindle 21 of the spindlehead 10. By actuating a motor 23, the drill 22 is rotated. The drill 22 can be automatically exchanged with a different drill by an automatic tool changer (ATC) 101.

A servomotor 31 and a speed reducer 32 are fixed on a support 30 within the body 2. A shaft 33 of the speed reducer 32 is supported by a support member 32. An arm 34 is fixed to the shaft 33. A rotary table 36 is provided on a base 35 which is fixed to the arm 34. The base 35 is provided with two rollers 37.

A member 38 formed in a C-shape is fixed to a front side of the body 2. The member 38 has a guide groove 39 having a roughly semicircular shape. The rollers 37 can be moved along the guide groove 39. The rotary table 36 can be indexed or continuously rotated about the first center axis U1 along a C1-direction or a C2-direction by the motor 40.

In addition, by actuating a motor 31, the rollers 37 are moved about the shaft 33 along the guide groove 39. Therefore, the rotary table 36 and the base 35 can be swung or rotated about a second center axis U2 along a B1-direction or a B2-direction.

For example, in FIG. 2, the base 35 with the rotary table 36 is rotated or swung by 90° angle along the B1-direction compared with the base 35 with the rotary table 36 shown in FIG. 1. In this position, the base 35 with the rotary table 36 is fixed relative to the body 2 by means of a means not shown.

The body 2 of the machine 1 is equipped with a body 51 of a pallet changer 50. The body 51 has a rotary means 54 having a octagonal shape. The rotary means 54 can be indexed at 90° angle along a R1-direction about a shaft 52 by an index motor 53. The rotary means 54 has rails 55, 56, 57, 58. Pallets P1 to P4 are detachably engaged to the rails 55 to 58, respectively. Each of the pallets P1 to P4 fixes a work W (W1 to W4) thereon.

A cylinder 61 of a pallet feed means 60 is fixed to a moving block 64 by supports 68. The moving block 64 can be moved along rails 63, 63 fixed on a base 62. A feedscrew 66 of a servomotor 65 engages a nut 67 which is fixed to the moving block 64. The servomotor 65 is fixed to the base 62.

The pallet changer 50 has a rail 72 for feeding the pallet between the pallet changer 50 and the rotary table 36. The rail 72 can be rotated or swung at 90° angle, for example, by a motor 90. The rail 72 is designed in such a manner that the pallet P1 in a transfer position P2 in the pallet changer should be transmitted to the rotary table 36 of the machine 1 or the pallet P1 on the rotary table 36 should be transmitted from the rotary table 36 to the position PS.

Incidentally, each of the pallets P1 to P4 has a concave member 71. A hook 70 fixed to an end of a rod 69 of the cylinder 61 engages in the concave member 71.

The machine 1, the pallet changer 50, the pallet transfer means 60, and the automatic tool changer 101 are controlled by a computer numerical control unit 100.

Next, referring to FIGS. 3 and 4, a position changing operation of the rotary table 36 within the machine 1 will be explained hereinafter.

In FIG. 3, the pallet P1 is previously set on the rotary table 36. The work W1 is fixed on the pallet P1. The base 35 is horizontally arranged. In the case shown, a hole H1 is formed in a first side F1 of the work W1 by moving the spindle head 10 in the Z1-direction.

Next, after upwardly moving the spindlehead 10 in the Z2-direction, the base 35 is rotated or swung by 90° angle about the shaft 33 in the B1-direction. When this rotating operation, the rollers 37, 37 are guided along the guide groove 39.

Thus, as shown in FIG. 4, a second side F2 of the work W2 faces the drill 22. In this rotating operation, chips T produced during the drilling operation on the first side F1 in the means 7 are stored in a tray of the means 7. The tray is removed from the body 2 to reduce the chips.

By moving downwardly the spindlehead 10 in the Z1-direction, a hole H2 is formed, and then the spindlehead 10 is upwardly moved in the Z2-direction.

Figure 5:
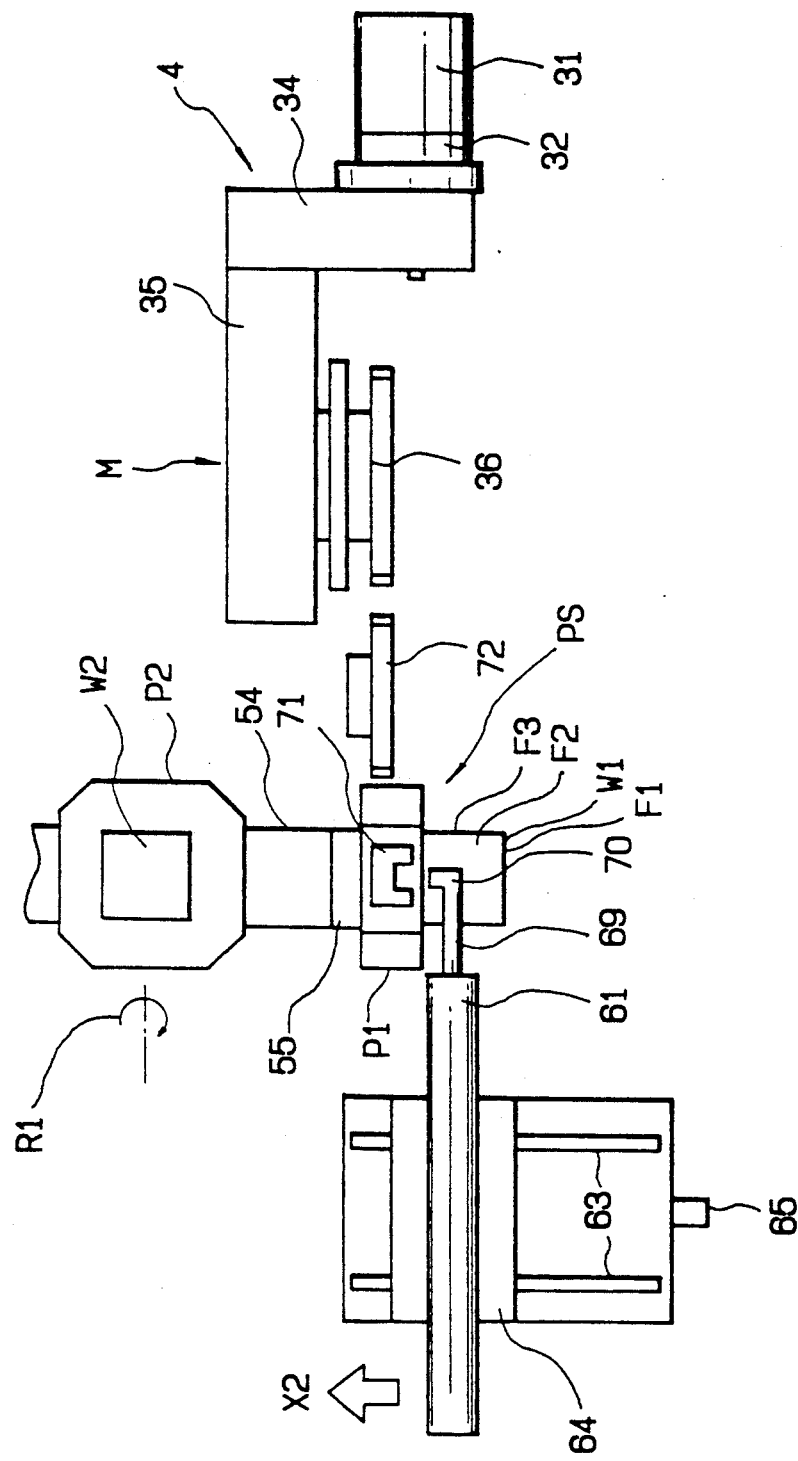
FIGS. 5 to 11 show a pallet exchanging operation between a machine and a pallet exchanger, and a work machining operation.

Furthermore, in the case of drilling a third side F3 shown in FIG. 5, the rotary table 36 is rotated by 90° angle about the first center axis U1.

Incidentally, as shown by an image line of FIG. 4, the rotary table 36 and the base 35 may be rotated, by a desired angle, for example, 90° angle in the B2-direction and then held. Furthermore, the desired angle is not limited to 90° angle.

Next, a pallet changing operation between the pallet changer 50 and the machine 1 will be explained hereinafter.

Referring to FIG. 5, the rotary table 36 is supported in the hold position M for changing the pallet corresponding to FIG. 4. The pallet P1 is not yet set on the rotary table 36. The cylinder 61 is moved along a small distance towards the motor 65 compared to the cylinder 61 of FIG. 6. Furthermore, the pallet P1 is indexed at the desired position PS in the pallet changer.

Figure 6:
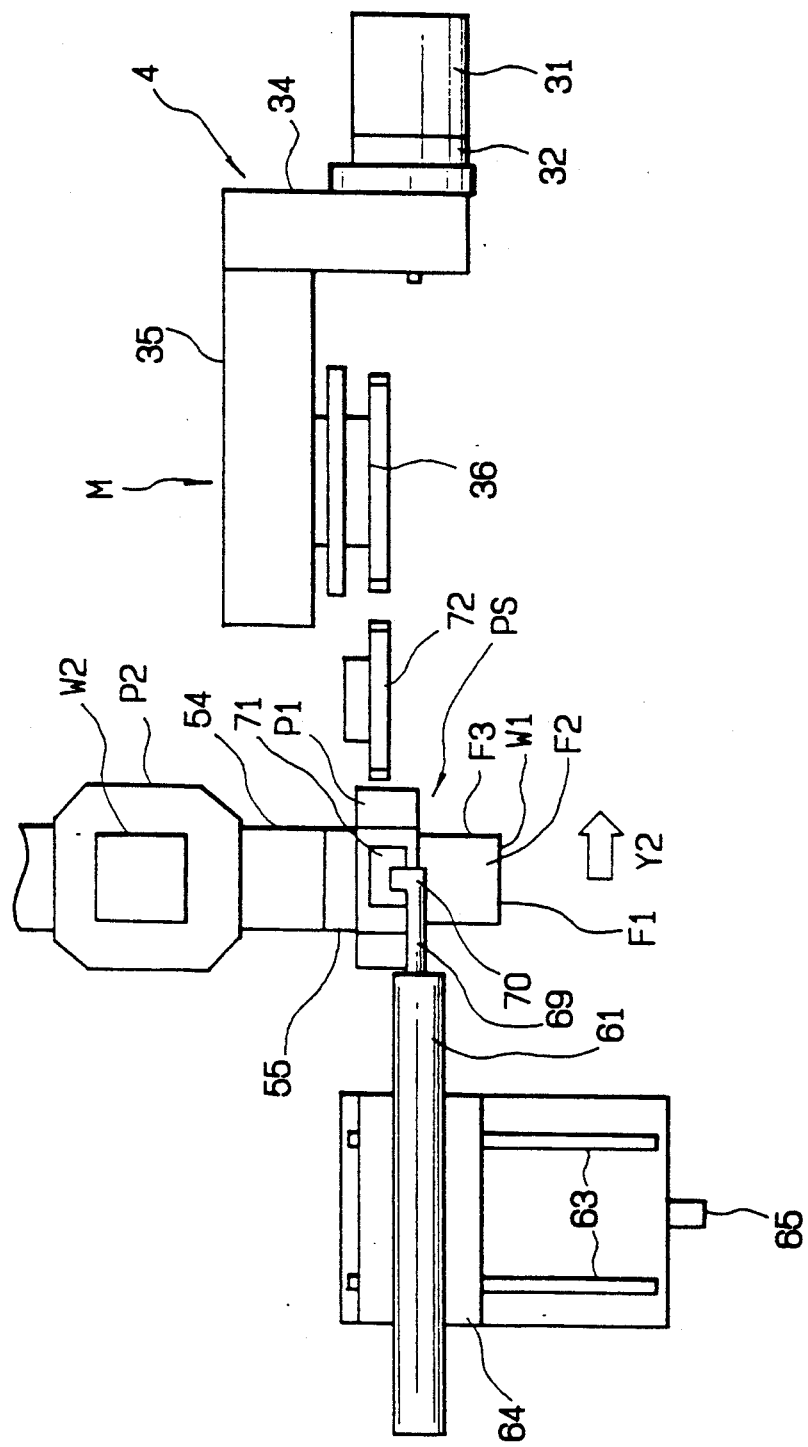
Figure 7:
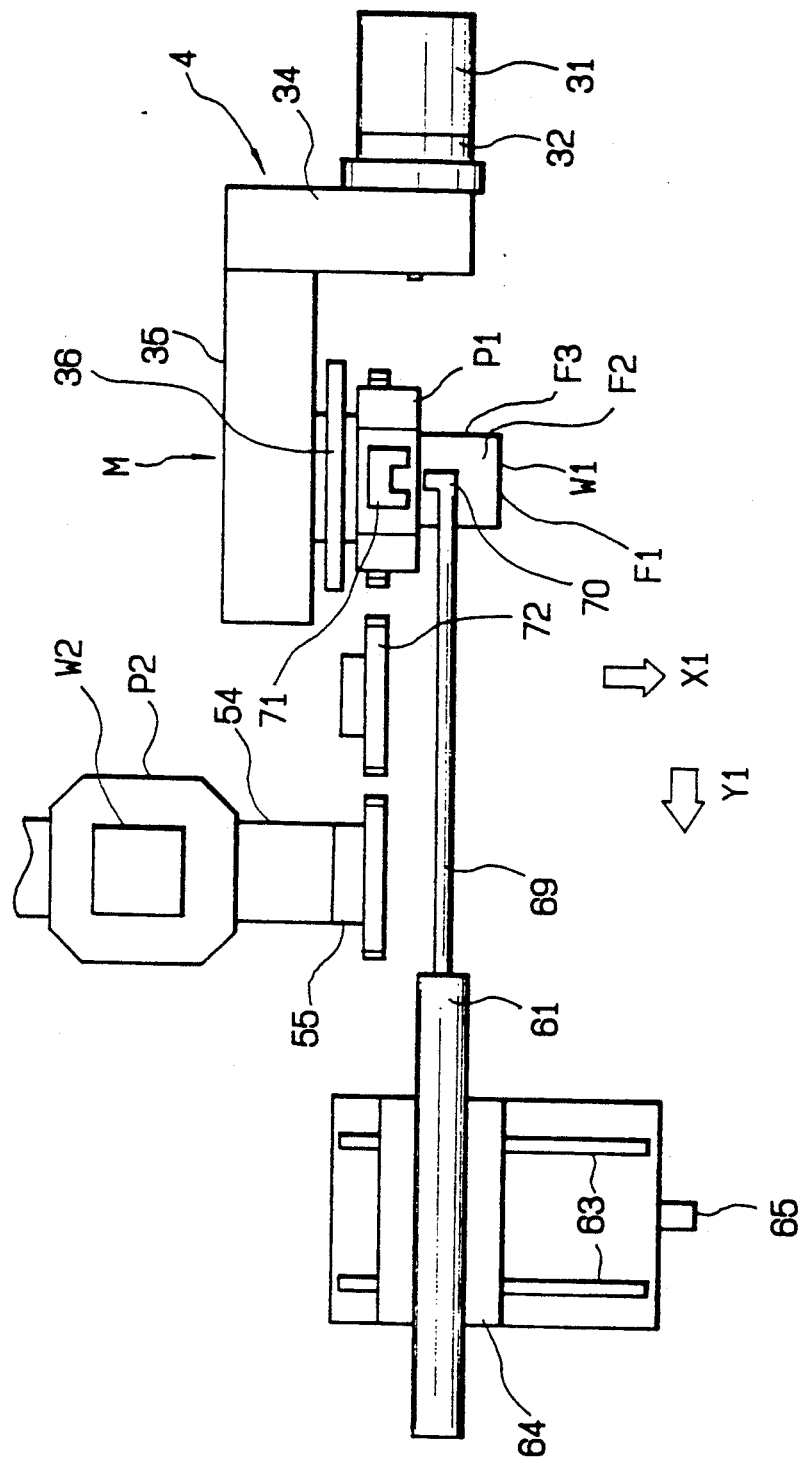

First, the cylinder 61 is moved in the X2-direction along a desired distance. Thus, as shown in FIG. 6, the hook 70 of the cylinder 61 engages the concave member 71. After that, the rod 69 of the cylinder 61 extends along the Y2-direction, as shown in FIG. 7, to move the pallet P1 by way of the rail 72 onto the rotary table 36. The hook 70 is removed from the concave portion 71 by moving the cylinder 61 along the X1-direction and then the rod 69 is contracted in the Y1-direction.

Figure 8:
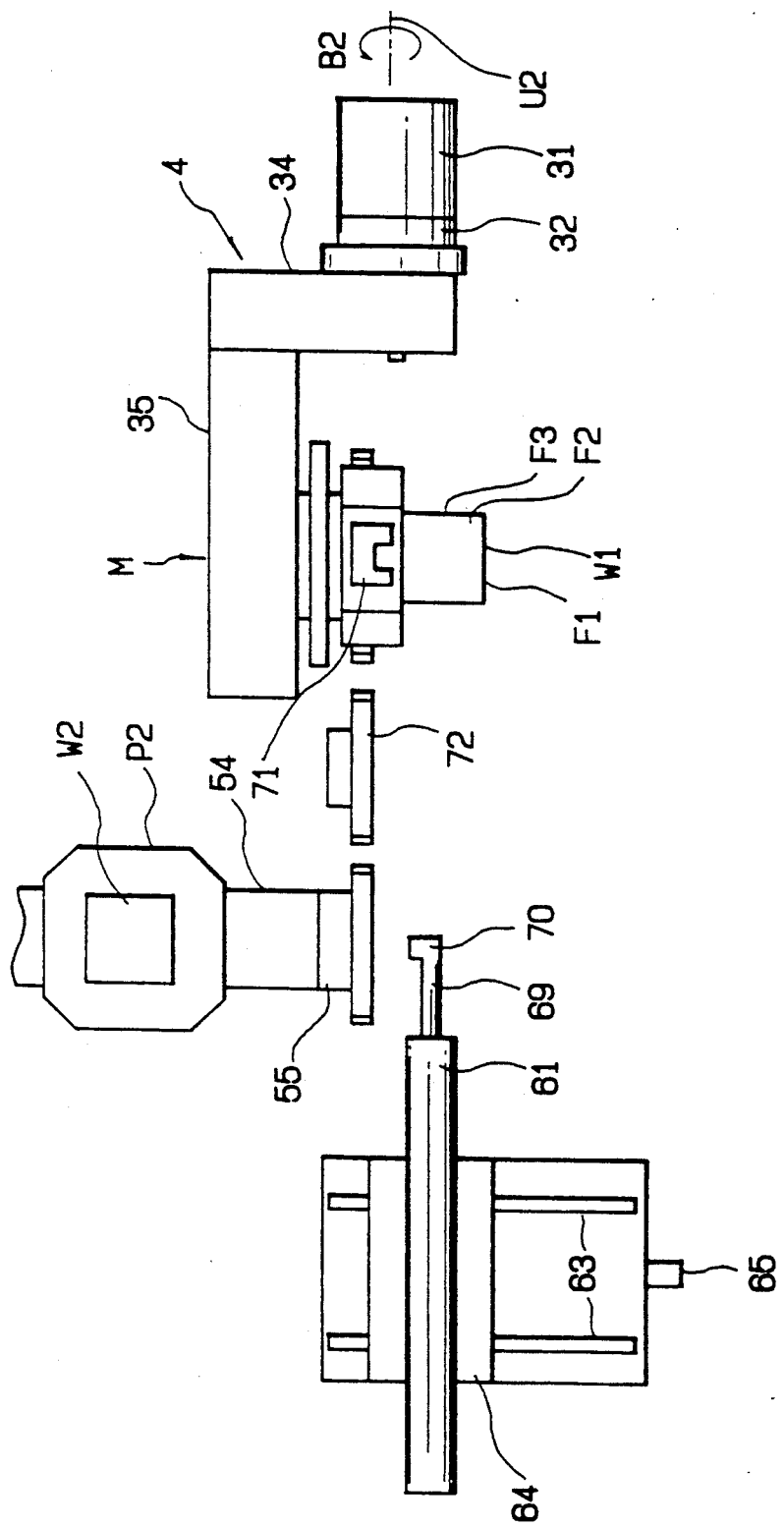
Figure 9:
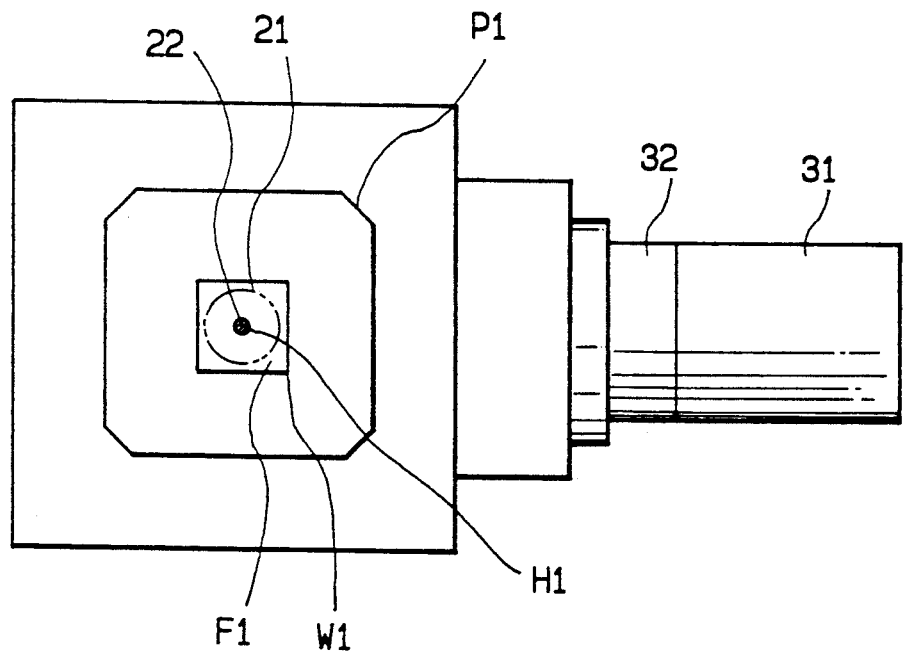

After that, the base 35 is counterclockwisely rotated by 90° angle along the B2-direction by shown in FIG. 8 to position the base 35 as shown in FIG. 3. A hole H1 is formed in the first side F1 of the work W1 by rotating the drill 22, as shown in FIG. 9.

Figure 10:
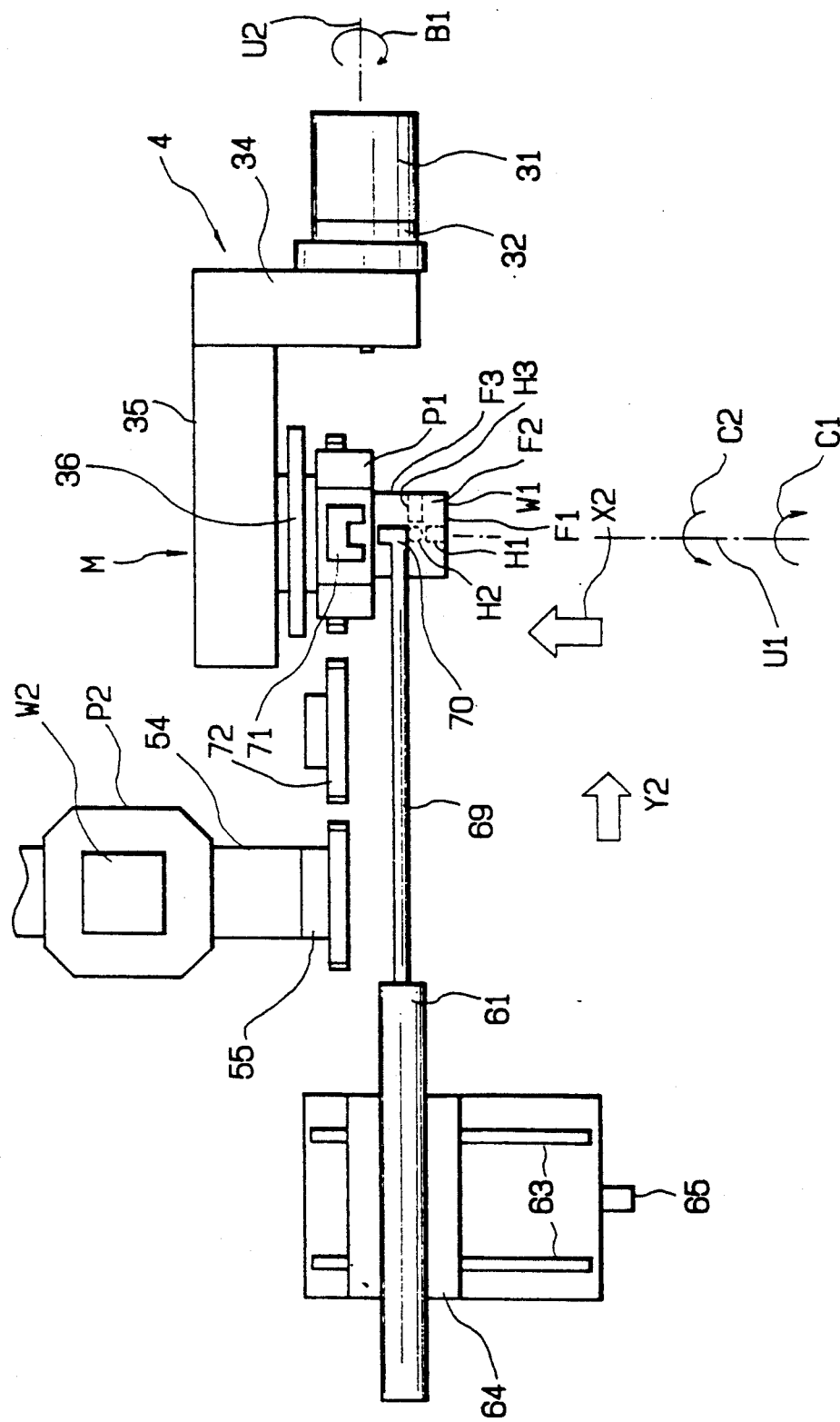

Next, in FIG. 10, the base 35 is rotated along the B1-direction so as to form a hole H2 in the second side F2 of the work W1. The rotary table 36 is rotated by 90° angle about the first center axis U1 along the C2-direction. Thus, a hole H3 is formed in the third side F3 of the work W1 by the drill 22. After that, the rotary table 36 is again rotated by 90° angle along the C1-direction. The rod 69 of the cylinder 61 extends and the cylinder 61 moves along the X2-direction so as to engage the hook 70 of the rod 69 with the concave member 71 of the pallet P1 as shown in FIG. 11.

Figure 11:
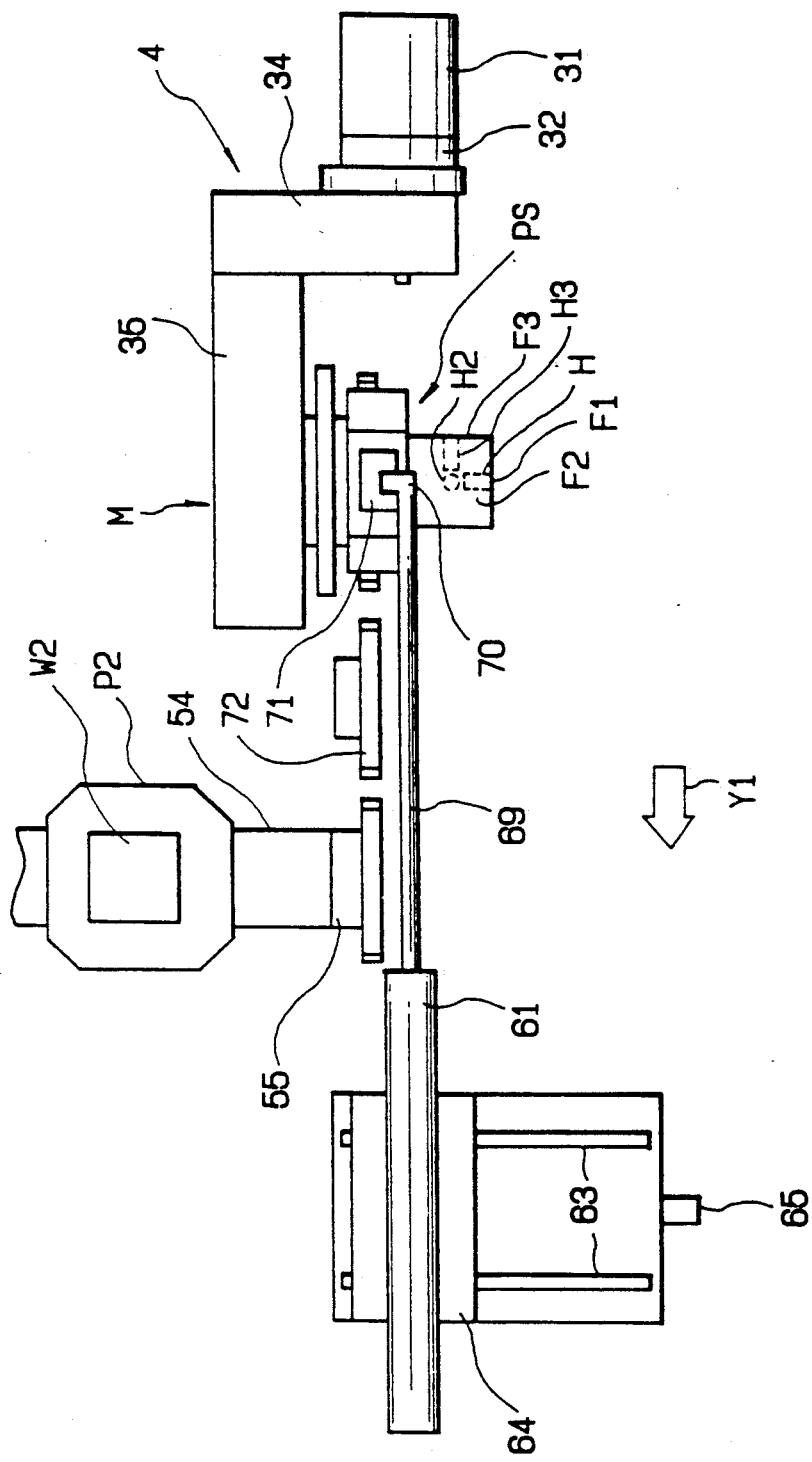

In FIG. 11, the rod 69 is contracted along the Y1-direction to move the pallet P1 via the guide rail 72 to the rail 55 of the rotary means 54.

The works W1 to W4 can be sequentially moved or transmitted to the rotary table 36 to perform the drilling operations or machining operations for the works W1 to W4.

Figure 12:
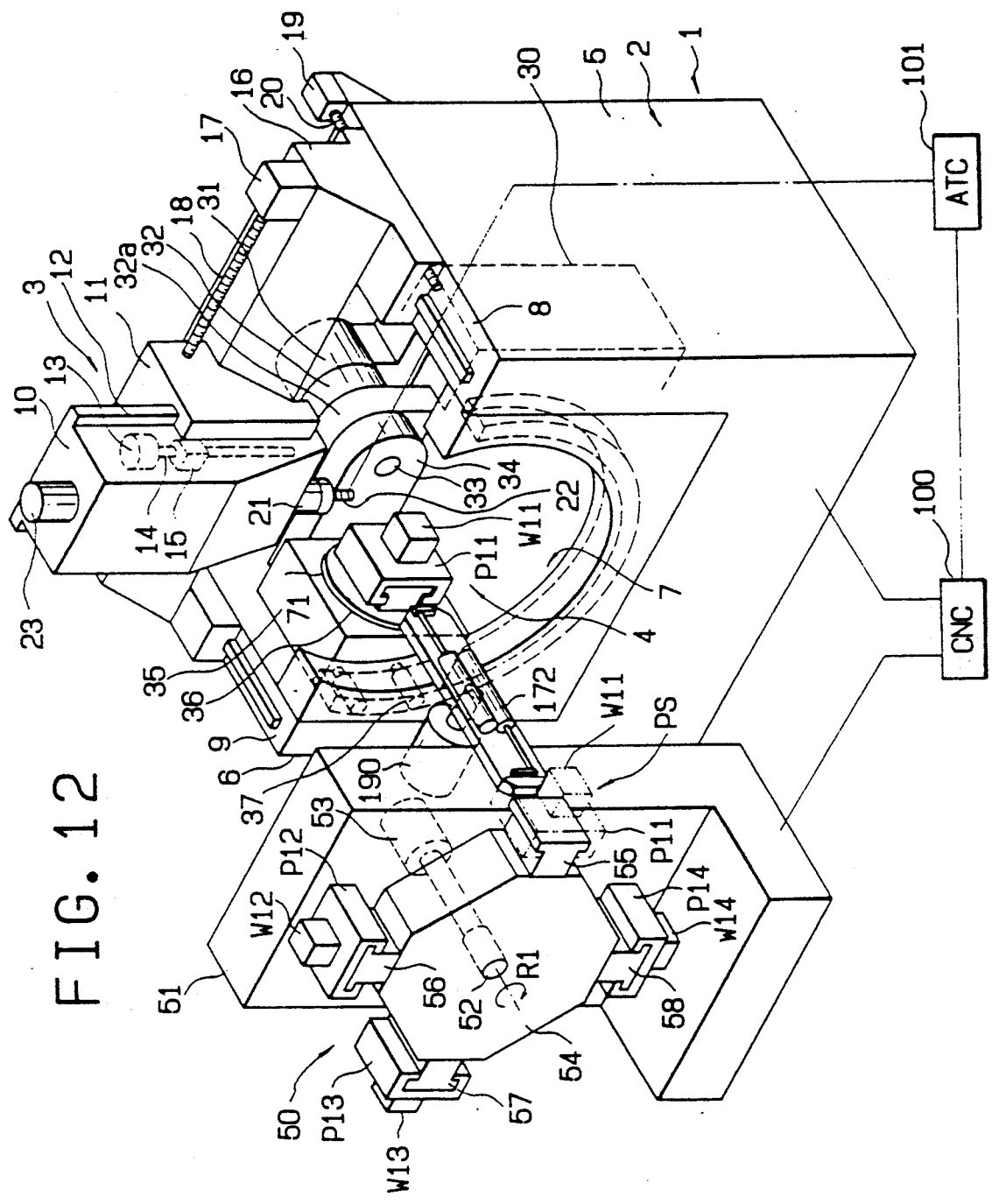
FIG. 12 is a perspective view showing a machining center as a second embodiment of a machine tool according to this invention.
Figure 18:
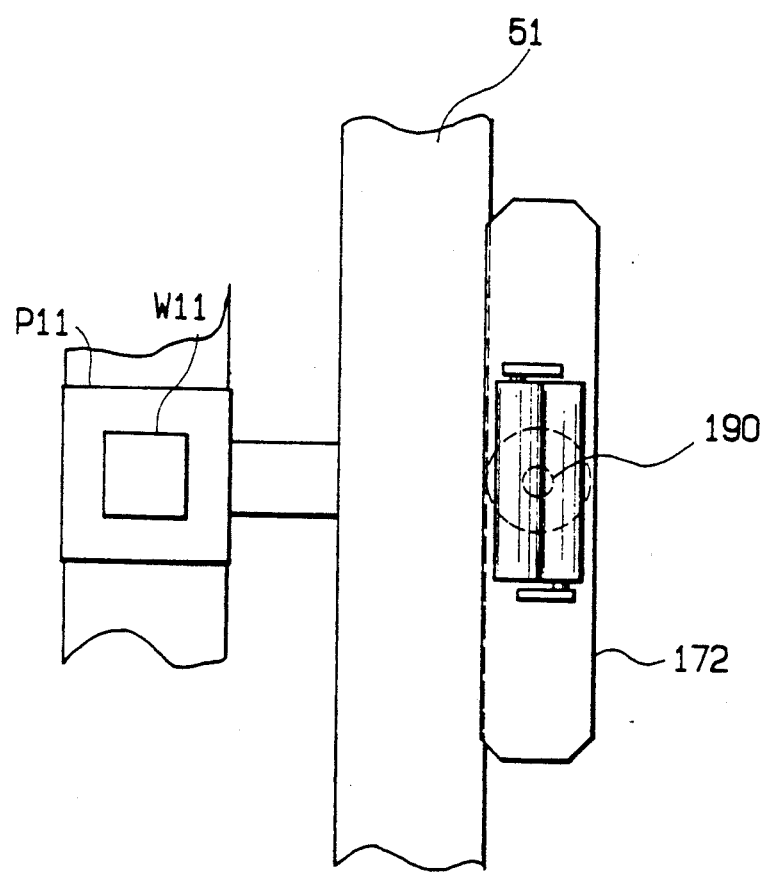

Referring to FIG. 12, the second embodiment in FIG. 12 is similar to the first embodiment in FIGS. 1 and 2 except that the second embodiment does not have the pallet changer 60, but the second embodiment is equipped with a rotary arm 172 in place of the rail 72 of FIG. 1. The rotary arm 172 can be indexed at 90° angle or 180° angle by an index motor 190 in such a manner that the rotary arm 172 can be horizontally positioned as shown in FIG. 12 or vertically positioned as shown in FIG. 18. Works W11–W14 are fixed on pallets P11 to P14, respectively, but each pallet has no concave member 71. As the members shown in FIG. 12 except the pallets P11 to P14 and the rotary arm 172 are substantially identical with the corresponding members shown in FIGS. 1 and 2, respectively, the members in FIG. 12 are indicated by the reference numerals corresponding to the members in FIGS. 1 and 2.

Figure 13:
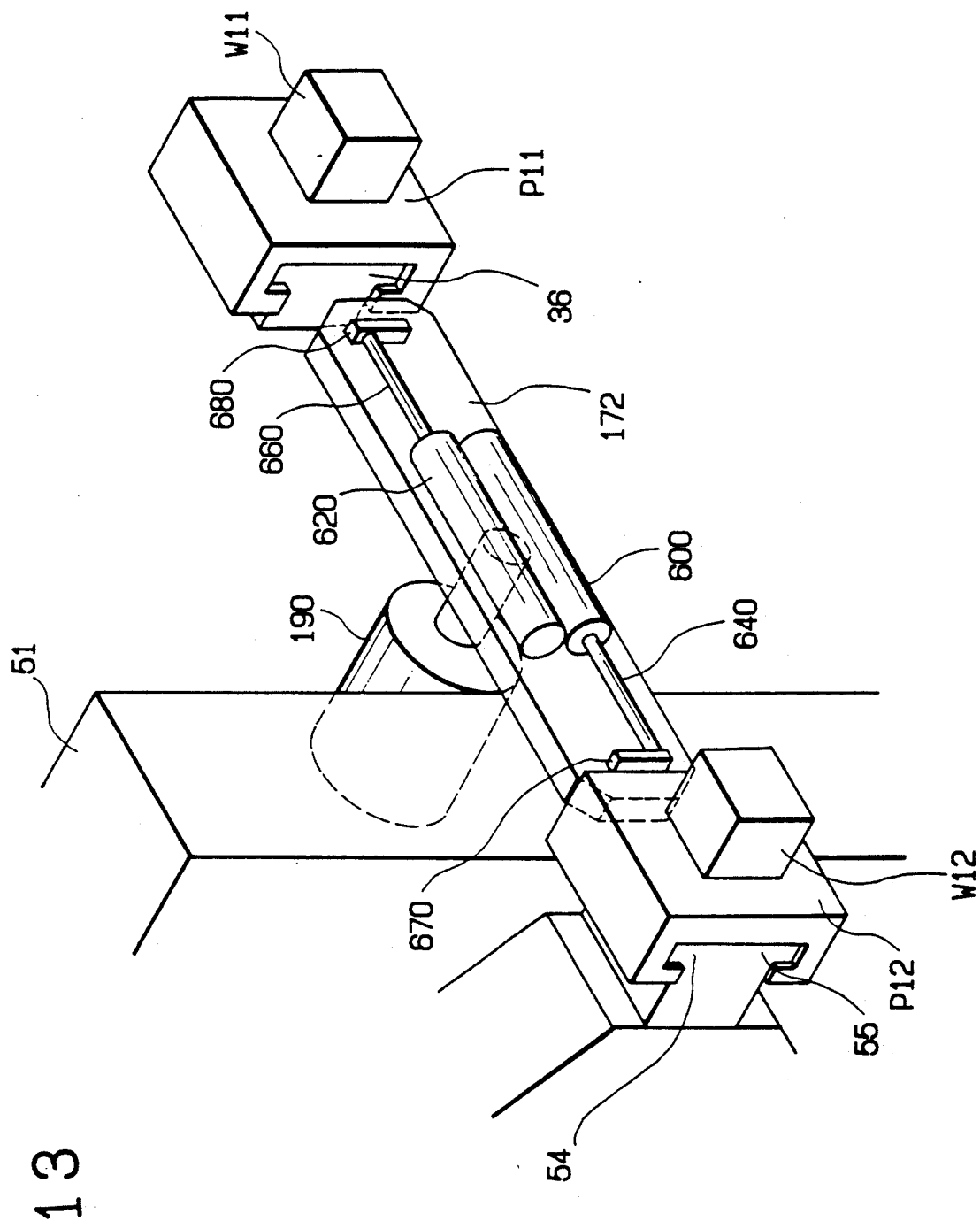
FIG. 13 is a perspective view showing a turning arm and peripheral members thereof.

Referring to FIG. 13, the rotary arm 172 formed in an elongated plate member is provided with hydraulic cylinders 600, 620. The rod 640 of the hydraulic cylinder 600 and the rod 660 of the hydraulic cylinder 620 can extend along the opposite direction one another in the longitudinal direction of the rotary arm 172. The rods 640, 660 are provided with connecting means 670, 680, respectively. Each of the connecting means 670, 680 is an electromagnet. The pallet P12 can be electromagnetically connected to the connecting means 670, while the pallet P11 can be electromagnetically connected to the connecting means 680. The connecting means 670, 680 may be designed to mechanically catch the pallet.

Next, an exchanging operation between the pallet 11 and the pallet 12 will be explained.

Figure 14:
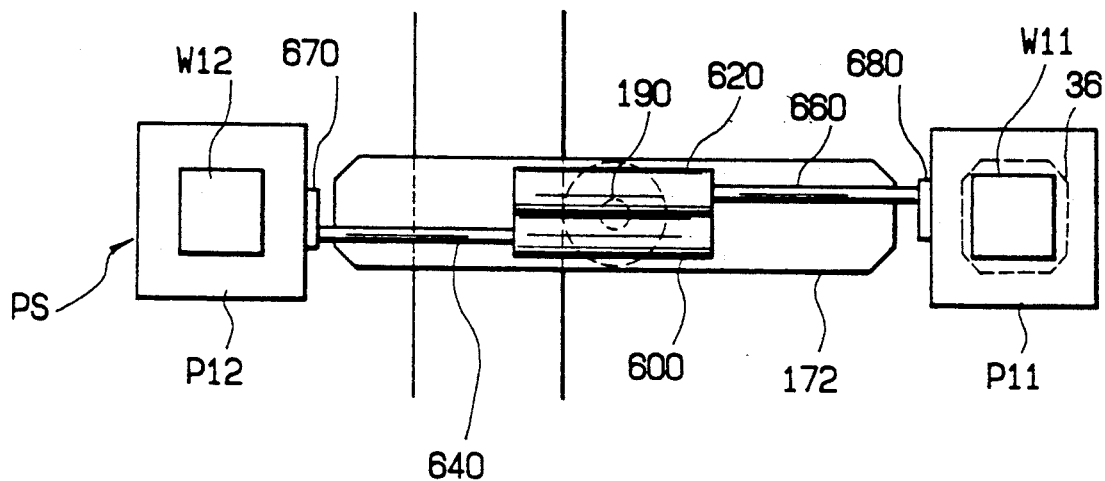
FIGS. 14 to 18 show an exchanging operation by the turning arm.

Referring to FIG. 14, the pallet P11 is set on the rotary table 36, while the pallet P12 is positioned at the transferring position PS. In this case, the rotary arm 172 is horizontary indexed and then the rod 640 of the hydraulic cylinder 600 and the rod 660 of the hydraulic cylinder 620 extend along the opposite direction one another. Thus, the pallets P12, P11 are electromagnetically connected to the connecting means 670, 680, respectively.

Figure 15:
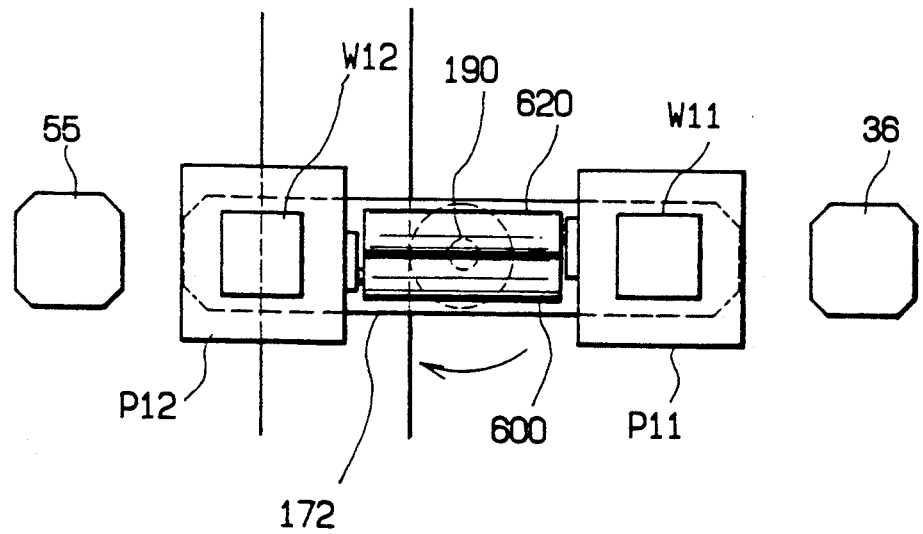

Next, the rods 640, 660 are contracted to position the pallets P11, P12 on the both end portions of the rotary arm 172, respectively, as shown in FIG. 15.

Figure 16:
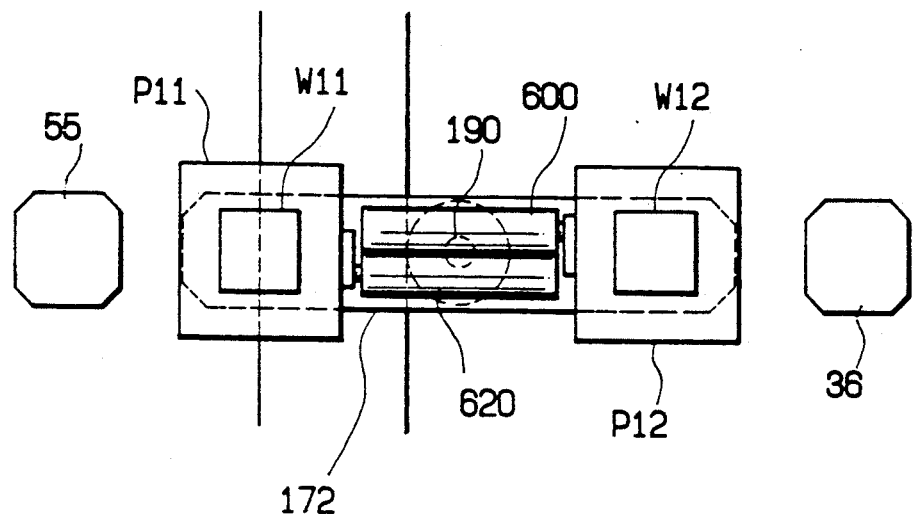
Figure 17:
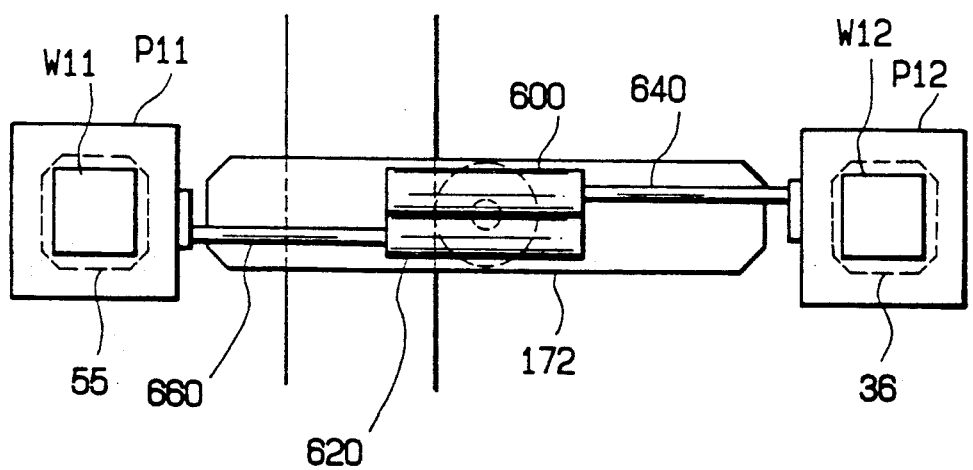

Next, the rotary arm 172 is rotated by 180° angle by the motor 190 as shown in FIG. 16. In FIG. 17, the rods 640, 660 extend again along the opposite direction. Thus the pallet P12 can be positioned on the rotary table 36, while the pallet P11 can be positioned at the transferring position PS thereby to completely perform the exchanging operation of the pallets P11 and P12.

By the way, this invention is not limited to the above-mentioned embodiments.

For example, it is conceivable that the base 35 may be equipped with plural rotary tables. In addition, the machine 1 may be provided with plural work operating means 4.

If the rotary table 36 is positioned at the changing position M, chips adhered on the work can be removed from the work by a chip removing means such as a brush to surely put down the chips within the chip processing means 7.

The pallet changer having the four rails is not limited.

A different actuating means in place of the hydraulic or pneumatic cylinder may employ as a pallet transfer means. The work operating means 4 may be moved along at least one of the X, Y and Z directions within the machine 1.

As can be seen from the foregoing, plural sides of a work can be machined without setting the work once again. Chips adhered on the machined side of the work can be removed by tilting the work. Various work operations can be performed by the XYZ-axis control and the U1-direction and U2-direction controls.

What is claimed is:

1. A machine tool comprising:
   (a) a tool (22);
   (b) a body (2) comprising a C-shape member (38) with an arc-shape guide groove (39);
   (c) a tool supporting means (10) for supporting the tool (22) wherein said tool supporting means (10) is movable with respect to said body (2);
   (d) a work operating means (4) for supporting a pallet (P) for setting a work (W), wherein the work operating means (4) comprises a base (35) provided with rollers (37) for interaction with the guide groove (39) and is movable with respect to the body (2);
   (e) a first moving means (31, 32, 32a, 33, 34, 37, 39) for moving the base (35) along the guide groove (39) such that the work operating means (4) moves about a center axis (U2) along a first path (B1, B2); and
   (f) a second moving means (11, 12, 13, 14, 15, 16, 17, 18, 19, 20) for moving the tool supporting means (10) so as to cause relative motion between the tool supporting means (10) and the work operating means (4) for performing a machining operation of the work (W).

2. The machine tool of claim 1, wherein the work operating means (4) further comprises a table (36) provided to the base (35), and an index means (40) for indexing the table (36) about an axis (U1).

3. The machine tool of claim 1 or 2, wherein the first moving means comprises a servomotor (31) supported to the body (2), a speed reducer 32 for reducing the revolution speed of the servomotor (31) a support (34) connected to a shaft (33) of the speed reducer (32) for supporting the work operating means (4), and a support (32a, 30) for supporting the shaft (33) of the speed reducer (32) relative to the body (2).

4. The machine tool of claim 1, wherein the second moving means comprises
   a first feed means (17, 18, 11) for feeding the tool supporting means (10) along a first feed path (X1, X2);
   a second feed means (19, 20, 16) for feeding the tool supporting means (10) along a second feed path (Y1, Y2); and
   a third feed means (12, 13, 14, 15) for feeding the tool supporting means (10) along a third feed direction (Z1, Z2).

5. The machine tool of claim 1, wherein the tool supporting means (10) comprises a spindle (21) rotatably supported therein for supporting the tool (22), and a means (23) for rotating the spindle (21).

6. The machine tool of claim 5, wherein the longitudinal axis of the spindle (21) is vertically directed and perpendicular to the center axis (U2) of the work operating means (4).

7. The machine tool of claim 1, wherein the center axis (U2) is perpendicular to the axis (U1).

8. The machine tool of one of claim 1, further comprising a pallet exchanging operation means (50, 60) for storing a plurality of pallets each having a work so as to exchange the pallet on the work operating means (4) for a different pallet stored in the pallet changing means (50, 60).

9. The machine tool of claim 8, wherein the pallet changing operation means comprises a pallet changer (50) for storing a plurality of the pallets (P1-P4) each having the work and a pallet feed means (60) for performing pallet exchanging operation between the pallet changer (50) and the work operating means (4) of the machine (1).

10. The machine tool of claim 9, wherein the pallet changer (50) comprises a body (51), a rotary means (54) for setting a plurality of the pallets (P1-P4) rotatably supported to the body (51), a member (72) arranged between the rotary means (54) and the work operating means (4) of the machine (1), and a drive means (53) for indexing the rotary means (54).

11. The machine tool of claim 10, wherein the pallet feed means (60) comprises an actuator (61) for feeding one of the pallets of the rotary means (54) from the rotary means (54) to the work operating means (4) by way of the member (72) or feeding the pallet on the work operating means (4) from the work operating means (4) to the rotary means (54) by way of the member (72).

12. The machine tool of one of claim 1, further comprising a pallet changing operation means (50, 172) for storing a plurality of pallets, each having a work so as to exchange the pallet on the work operating means (4) for a different pallet stored in the pallet changing means (50, 172).

13. The machine tool of claim 12, wherein the pallet changing operation means comprises a pallet changer (50) for storing a plurality of the pallets (P1-P4) each having the work, and a pallet changing arm (172) for performing pallet changing operation between the pallet changer (50) and the work operating means (4) of the machine (1).

14. The machine tool of claim 13, wherein the pallet changer (50) comprises a body (51), a rotary means (54) for setting a plurality of the pallets (P1-P4) rotatably supported to the body (51), and a drive means for indexing the rotary means (54).

15. The machine tool of claim 13, wherein the pallet changing arm (172) comprises actuators (600, 620) each for detachably supporting the pallet, and an index means (190) for indexing the pallet changing arm (172).

16. The machine tool of claim 15, wherein each actuator (600, 620) is a hydraulic or pneumatic cylinder which has a rod (640, 660) and a electromagnet (670, 680) fixed to the end of the rod.

17. A machine tool comprising:
(a) a tool (22);
(b) a body (2);
(c) a tool supporting means (10) for supporting the tool (22), wherein said tool supporting means (10) is movable with respect to the body (2);
(d) a work operating means (4) for supporting a pallet (P) for setting a work (W), wherein said work operating means (4) is movable with respect to said body (2);
(e) a first moving means (31, 32, 32a, 33, 34, 37, 39) for moving the work operating means (4) about a center axis (U2) along a first path (B1, B2), the first moving means comprising a servomotor (31) supported to the body (2), a speed reducer 32 for reducing the revolution speed of the servomotor (31), a support (34) connected to a shaft (33) of the speed reducer (32) for supporting the work operating means (4), and a support (32a, 30) for supporting the shaft (33) of the speed reducer (32) relative to the body (2); and
(f) a second moving means (11, 12, 13, 14, 15, 16, 17, 18, 19, 20) for moving the tool supporting means (10) so as to cause relative motion between the tool supporting means (10) and the work operating means (4) for performing a machining operation of the work (W).

18. The machine tool of claim 17, wherein the work operating means (4) comprises a base (35), a table (36) provided to the base (35), and an index means (40) for indexing the table (36) about an axis (U1).

19. A machine tool comprising
(a) a tool (22);
(b) a body (2);
(c) a tool supporting means (10) for supporting the tool (22), wherein said tool supporting means (10) is movable with respect to the body (2);
(d) a work operating means (4) for supporting a pallet (P) for setting a work (W), wherein said work operating means (4) is movable with respect to said body (2);
(e) a first moving means (31, 32, 32a, 33, 34, 37, 39) for moving the work operating means (4) about a center axis (U2) along a first direction (B1, B2);
(f) a second moving means (11, 12, 13, 14, 15, 16, 17, 18, 19, 20) for moving the tool supporting means (10) so as to cause relative motion between the tool supporting means (10) and the work operating means (4) for performing machining operation of the work (W); and
(g) a pallet changing operation means (50, 172) comprising a pallet changer (50) for storing a plurality of pallets (P1-P4) each having a work and a pallet changing arm (172) comprising actuators (600, 620), each for detachably supporting the pallet and each of which is a hydraulic or pneumatic cylinder which has a rod (640, 660) and a electromagnet (670, 680) fixed to the end of the rod, and an index means (190) for indexing the pallet changing arm (172) for performing a pallet changing operation between the pallet changer (50) and the work operating means (4) of the machine (1) so as to exchange the pallet on the work operating means (4) for a different pallet stored in the pallet changing means (50, 172).

* * * * *